Nov. 17, 1931.  H. A. HADLEY  1,832,551
HANGING SCALE
Filed June 12, 1931
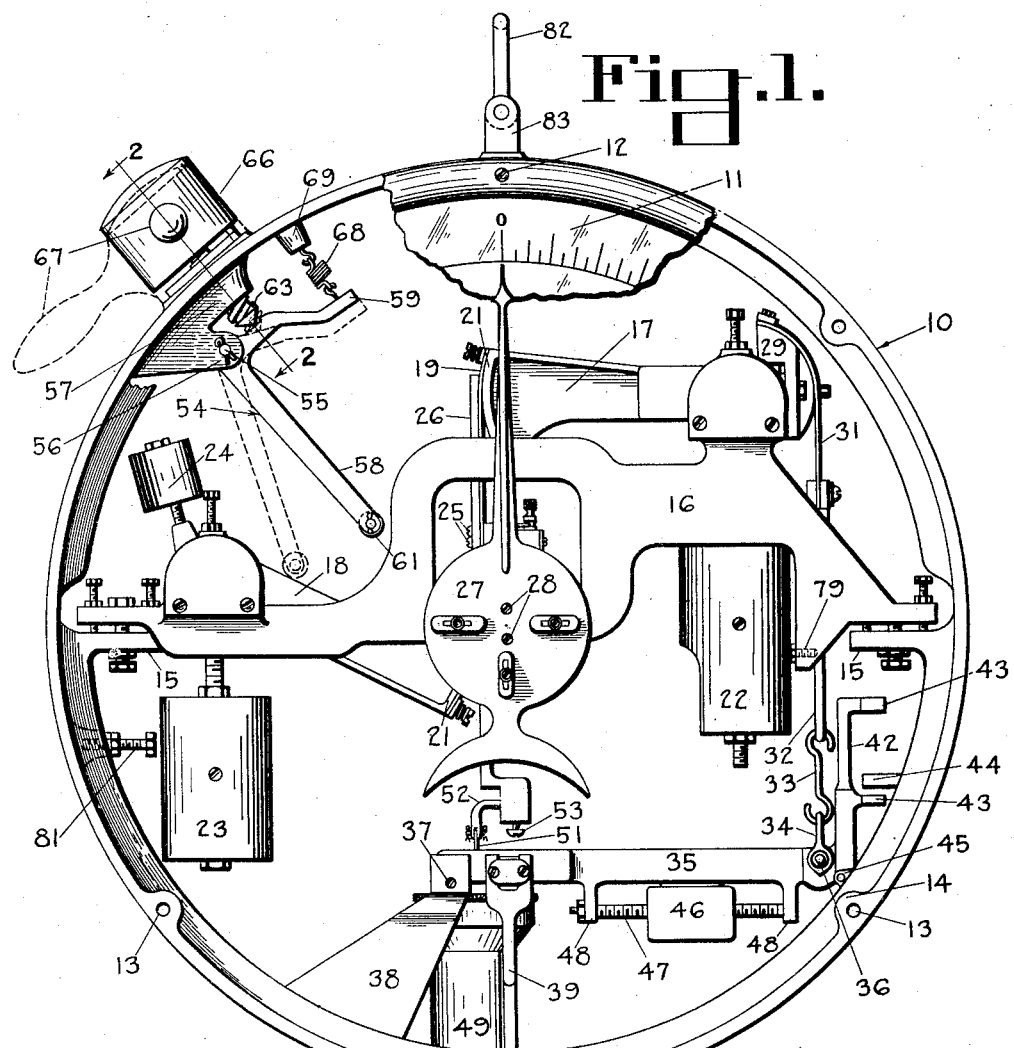
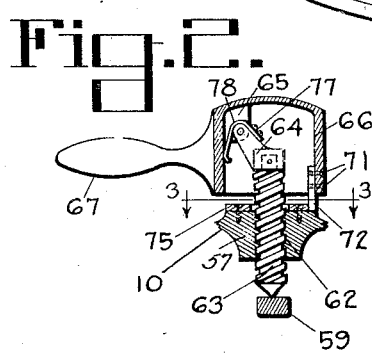
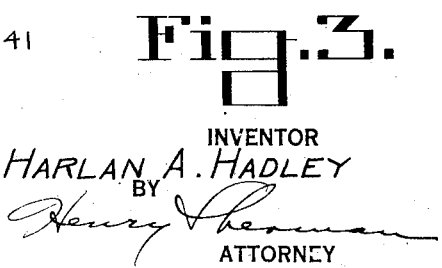
INVENTOR
HARLAN A. HADLEY
BY
ATTORNEY Patented Nov. 17, 1931

1,832,551

UNITED STATES PATENT OFFICE

HARLAN A. HADLEY, OF ST. JOHNSBURY, VERMONT

HANGING SCALE

Application filed June 12, 1931. Serial No. 543,914.

This invention relates to weighing scales of the type having load counterbalancing pendulums, but this invention has more particular relation to scales of the hanging, or suspension, type in which the load in the weigh pan is offset, or counterbalanced, by a pair of pendulums.

It is an object of this invention to provide improved means for preventing relative movement of the scale parts when the scale is being packed for shipment or transported from place to place while in use, the construction and arrangement being preferably such that a member is readily and quickly moved into engagement with a pendulum to lock the same and when moved away therefrom frees the pendulum and does not interfere with its free movement.

Another object of this invention is to provide an improved means for securing the pendulums from relative movement, the construction providing preferably a member for engaging one of the pendulums to lock both in position.

Other objects of this invention, together with certain details of construction and combination of parts, will be more particularly described in the accompanying specification and pointed out in the appended claims.

In the drawings:

Figure 1 is a front elevation of the hanging, or suspension, scale with my invention applied thereto, the dial being broken away to disclose the scale mechanism;

Figure 2 is a cross-sectional view taken on line 2—2 in Figure 1; and

Figure 3 is a cross-sectional view taken on line 3—3 in Figure 2 showing the construction of the locking plate.

Similar characters of reference indicate corresponding parts throughout the several views of the drawings.

Referring to the drawings wherein the preferred embodiment of my invention is shown, the reference numeral 10 designates the scale casing, which is provided with a dial 11 secured to the casing by screws 12 received in the screw-threaded apertures 13 formed in lugs 14 cast integral with the casing.

Integral with the casing are the diametrically opposed, inwardly extending shelves 15 which support the pendulum frame 16, on which are suitably pivoted the load counterbalancing means comprising the pendulum arm 17 and the auxiliary pendulum arm 18 suitably connected to each other by means of the flexible steel ribbon 19 attached to the arcuate faces of the segments 21 formed on the inner extremities of the pendulum arms. The pendulum arm 17 adjustably supports the pendulum weight 22 and the auxiliary pendulum arm adjustably carries the weights 23 and 24, the function of which is well understood in the art.

Secured to the ribbon 19 by means of screws 25 is a rack bar guide 26 which vertically reciprocates a rack (not shown) meshing with a pinion (not shown) fixed upon a shaft on which shaft is rigidly mounted the indicator 27 by screws 28. When the rack is caused to reciprocate, the pinion and shaft are rotated and the indicator moves over the face of the dial.

The pendulum arm 17 carries at its outer end the eccentric 29 to which is attached the flexible tape 31 carrying at its lower extremity the clevis 32. From the clevis is suspended the hook 33 on which is mounted the loop 34. The loop is U-shaped and spans the shelf lever 35, which is pivoted thereto by the knife edge 36. The lever 35 is fulcrumed at 37 in any suitable manner on the standard 38 suitably secured to the scale casing. Intermediate the ends of the lever is pivotally supported the link 39, from which depends a swivelly mounted hook 41 adapted to support a weigh pan, or the like. At the end remote from the fulcrum point the lever 35 has a vertical arm 42 cast integral therewith, the arm being provided with the fingers 43 which cooperate with the stops 44 integral with the scale casing to limit the vertical reciprocation of the lever. Stops 45 limit the lateral travel of the lever.

The balance weight 46 is adjustable along the stem 47, journaled in depending ears 48 integral with the lever 35. The dash pot 49 is suitably fixed to the scale casing, the piston 51 of the dash pot being connected to the rack bar guide by means of the bent rod 52 which is adjustably received in the lower end of the guide and retained in adjusted position by the set screw 53.

For the purpose of locking the pendulum against movement when the scale is moved from one position to another or when it is to be packed for shipment, there is provided the locking lever 54, substantially similar in form to a bell-crank, which is pivoted at 55 in a pair of ears 56 projecting from the boss 57 formed integral with the casing 10. The lever comprises preferably the long arm 58 and the short, offset arm 59 substantially at a right angle thereto. The lower extremity of the long arm is bifurcated, the roller 61 being suitably journaled in the bifurcation. Extending through the wall of the casing 10 and the boss 57 is the screw-threaded opening 62, in which is received the quadruple-threaded screw 63 for quick and secure adjustment. The latter is secured at its upper extremity to the bracket 64, pivotally attached to the lug 65 formed in the inverted cup portion 66 of the handle 67. The lower, or inner, end of the screw impinges against the short arm of the lever, the latter being maintained in engagement with the screw through the medium of a spring 68, attached to the free end of the arm 59 and to the boss 69 integral with the casing. The spring also maintains the long arm 58 in a raised, or unlocked, position where it will not interfere with the free movement of the pendulums.

Depending from the rim of the cup 66 and fixed thereto by screws 71 is the dog 72, which is adapted to enter the slots 73 and 74 formed in the plate 75, secured to the casing by screws 76, to retain the locking handle in either locked or unlocked position. Suitably attached to the bracket 64, as by screws 77, is one end of the leaf spring 78, the free end of which bears against the inside of the cup 66. The function of the spring 78 is to prevent the accidental disengagement of the dog from the locking slots in the plate 75.

When it is desired to lock the pendulums against movement, the handle 67 is depressed against the action of spring 78 thus releasing the dog from the slot 74. The handle is then given a quarter turn to the position shown in broken lines in Figure 1, thereby turning the screw inwardly to force the roller 61 at the extremity of arm 58 into engagement with the pendulum arm thus forcing the pendulum weights 22 and 23 against the adjustable stops 79 and 81, mounted in the frame and casing, respectively. The dog is then placed in the slot 73 thus locking the pendulums against movement. The scale is unlocked by depressing the handle, releasing the dog and turning the handle to move the screw outwardly, the spring 68 lifting the arm 58 to a raised position.

For the purpose of hanging the scale from any suitable support there is provided the link 82, pivotally mounted on the lug 83 integral with the casing.

As many changes could be made in the above construction and apparently widely different embodiments of this invention could be made without departing from the scope thereof, it is intended that all matter contained in the above description or shown in the accompanying drawings shall be interpreted as illustrative and not in a limiting sense.

I claim:—

1. In a scale of the class described, load counterbalancing means including a pair of pendulums, a locking lever adapted to engage said counterbalancing means to lock said pendulums against movement, means including a screw for actuating said locking lever, and a handle pivoted on said screw for rotating the latter.

2. In a scale of the class described, load counterbalancing means including a pair of pendulums, a locking lever adapted to engage said counterbalancing means to lock said pendulums against movement, a quick acting screw for actuating said locking lever, and a handle for rotating said screw and means for latching said handle.

3. In a scale of the class described, load counterbalancing means including a pair of pendulums, a locking lever adapted to engage said counterbalancing means to lock said pendulums against movement, a screw for actuating said locking lever, a handle for rotating said screw, and means including a notched plate for latching said handle.

4. In a scale of the class described, load counterbalancing means including a pair of pendulums, a locking lever adapted to engage said counterbalancing means to lock said pendulums against movement, a screw for actuating said locking lever, a handle for rotating said screw and means including a notched plate, and a dog for latching said handle.

5. In a scale of the class described, load counterbalancing means including a pair of pendulums, a locking lever adapted to engage said counterbalancing means to lock said pendulums against movement, a screw for actuating said locking lever, a handle pivoted on said screw for rotating the latter, said handle having a dog thereon, a locking plate, and means for normally keeping the dog in engagement with said plate.

6. In a scale of the class described, load counterbalancing means including a pair of pendulums, a locking lever adapted to engage said counterbalancing means to lock said pendulums against movement, a quadruple-thread screw for quickly actuating said locking lever, a handle pivoted to said screw for rotating the latter, said handle having a dog thereon, a locking plate having notches therein, and means for normally keeping said dog in engagement with said plate.

7. In a scale of the class described, load counterbalancing means including a pair of pendulums, a locking lever adapted to engage said counterbalancing means to lock said pendulums against movement, a quadruple-thread screw for readily and quickly actuating said locking lever, a handle pivoted to said screw for rotating the latter, said handle having a dog thereon, a locking plate having notches thereon, and a spring for normally keeping said dog in engagement with said plate.

In testimony whereof, I have hereunto affixed my signature.

HARLAN A. HADLEY.